United States Patent
Jung (10) Patent No.: US 11,800,850 B2
(45) Date of Patent: Oct. 31, 2023

(54) SMART BARN SYSTEM AND SMART BARN CONTROL METHOD FOR DETECTING ABNORMAL SIGN OF LIVESTOCK AND TAG ATTACHABLE TO LIVESTOCK

(71) Applicant: Electronics and Telecommunications Research Institute, Daejeon (KR)

(72) Inventor: Jae Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 17/370,483

(22) Filed: Jul. 8, 2021

(65) Prior Publication Data
US 2022/0007614 A1 Jan. 13, 2022

(30) Foreign Application Priority Data
Jul. 8, 2020 (KR) .......................... 10-2020-0084311

(51) Int. Cl.
*A01K 11/00* (2006.01)
*A01K 29/00* (2006.01)

(52) U.S. Cl.
CPC .......... *A01K 11/004* (2013.01); *A01K 29/005* (2013.01)

(58) Field of Classification Search
CPC .... A01K 11/004; A01K 29/005; G06Q 50/02; G08B 5/22; G08B 21/18
USPC ...................................... 340/573.3
See application file for complete search history.

(56) References Cited

U.S. PATENT DOCUMENTS

| | | | |
|---|---|---|---|
| 2016/0120144 A1 | 5/2016 | Kim et al. | |
| 2016/0205894 A1 | 7/2016 | Kim et al. | |
| 2017/0098959 A1* | 4/2017 | Kikuchi | H02M 7/04 |
| 2019/0014741 A1* | 1/2019 | Shrestha | A01K 1/031 |
| 2019/0380311 A1* | 12/2019 | Crouthamel | A01K 11/004 |
| 2021/0045362 A1* | 2/2021 | Gritzman | A01K 29/005 |

FOREIGN PATENT DOCUMENTS

| | | |
|---|---|---|
| KR | 101711119 B1 | 2/2017 |
| KR | 101995755 B1 | 10/2019 |
| KR | 102034998 B1 | 10/2019 |

* cited by examiner

*Primary Examiner* — Omar Casillashernandez
(74) *Attorney, Agent, or Firm* — William Park & Associates Ltd.

(57) ABSTRACT

Provided are a smart barn system and smart barn control method for detecting an abnormal sign of livestock and a tag attachable to livestock. The smart barn system includes a plurality of tags attached to ears of livestock bred in a pigsty and configured to measure temperatures of the livestock and transmit the measured temperature information of the livestock, a plurality of antennas configured to transmit and receive wireless signals to and from the tags, a reader configured to collect tag information of the livestock, which approaches an apparatus for providing feed and water, through any one of the plurality of antennas and measure an access frequency of the tag, which is collected through each of the antennas, through the collected tag information of the livestock, and a plurality of wireless power switching modules provided between the antennas and the reader and connected in a cascade.

13 Claims, 10 Drawing Sheets

SMART BARN SYSTEM AND SMART BARN CONTROL METHOD FOR DETECTING ABNORMAL SIGN OF LIVESTOCK AND TAG ATTACHABLE TO LIVESTOCK

CROSS-REFERENCE TO RELATED APPLICATION

This application claims priority to and the benefit of Korean Patent Application No. 10-2020-0084311 filed on Jul. 8, 2020, the disclosure of which is incorporated herein by reference in its entirety.

BACKGROUND

1. Field of the Invention

The present invention relates to a smart barn system for detecting an abnormal sign of livestock and, more particularly, to a smart barn system for detecting an abnormal sign of livestock using information and communications technology (ICT).

2. Discussion of Related Art

Lately, while the number of farms has been rapidly reduced, farms have been gradually increasing in scale and have run on intensive factory farming to improve the productivity of livestock products. Battery farming worsens the immunity of livestock and is also noted as the main cause of animal infectious diseases.

This is related to the frequent occurrence of livestock diseases which cause enormous damage such as virulent animal infectious diseases including domestic and foreign African swine fever (ASF), foot-and-mouth disease, avian influenza, and the like.

Livestock farms have made various efforts to monitor diseases of livestock at an early stage in a dense breeding environment. Representative related technology for detecting abnormal diseases signs of livestock include analysis through collection of specification data, such as feed intake and drinking water intake, biometric information analysis, such as livestock body temperature measurement, activity analysis through a closed circuit television (CCTV), and the like.

According to an existing specification data analysis technology, the degree of anorexia is measured by comparing feed and water intakes, and early signs of diseases are detected accordingly. This method makes it possible to detect group infections but has a limitation in detecting an abnormal disease symptom of an individual entity at an early stage.

Next, a method of detecting an abnormal disease symptom through livestock body temperature is described. Type one animal infectious diseases, such as foot-and-mouth disease widespread all over the country, and various diseases which may occur on farms have a common point that the diseases are accompanied by partial high fever. A body temperature deviating from a normal temperature range may be basic data for confirming a symptom of a disease at an early stage on the basis of the common point. For example, when pigs are infected with ASF, the body temperature rises up to 41° C., and the pigs tend to stick together due to chills. Many pigs get sick with a fever in this way, and then the disease spreads explosively over time.

The related technology introduces a non-contact body temperature measurement system, such as a thermal imaging camera, but the measured value is affected by ambient temperature.

Next, video-based livestock activity analysis is described. This is a technology for detecting an abnormal disease symptom at an early stage by analyzing livestock movement through a CCTV. Recently, a deep learning technique is being used to estimate how much livestock moves during a certain time.

However, this technology is highly likely to have low accuracy and have problems with image quality deterioration in a night shoot and individual recognition in an environment in which several animals are densely bred.

SUMMARY OF THE INVENTION

The present invention is directed to providing a barn for detecting an abnormal disease symptom of livestock using a radio frequency identification device in a battery farming environment and a method of controlling the barn.

Objects of the present invention are not limited to that described above, and other objects which have not been described above will be clearly understood by those of ordinary skill in the art from the following descriptions.

According to an aspect of the present invention, there is provided a smart barn system for detecting an abnormal sign of livestock, the smart barn system including a plurality of tags attached to ears of livestock bred in a pigsty and configured to measure temperatures of the livestock and transmit the measured temperature information of the livestock, a plurality of antennas configured to transmit and receive wireless signals to and from the tags, a reader configured to collect tag information of the livestock, which approaches an apparatus for providing feed and water, through any one of the plurality of antennas and measure an access frequency of the tag, which is collected through each of the antennas, through the collected tag information of the livestock, and a plurality of wireless power switching modules provided between the antennas and the reader and connected in a cascade.

The tag may include an insertion portion having one side formed in a cone shape to easily pierce the ear of the livestock, a body portion having one side extending in a cylindrical shape from the insertion portion and configured to pierce the ear of the livestock after the insertion portion does and support the tag, a temperature sensor provided in the body portion and configured to measure the body temperature of the livestock, an electronic part formed on the other side of the body portion so that the body portion may not come off the ear of the livestock in a state of being supported by the ear of the livestock, and a fixing portion inserted onto the insertion portion, which pierces the ear of the livestock, so that the tag may be fixed to the ear of the livestock without coming off the ear after the fixing portion is attached to the ear of the livestock through the insertion portion.

The electronic part may include a power generator configured to generate and supply power required for the tag and a communicator configured to transmit the temperature information of the livestock measured through the temperature sensor to the reader.

The power generator may include a harvesting power generator which generates the power to be used by the tag.

Meanwhile, the harvesting power generator may generate the power using at least one of a radio wave energy collector configured to collect wireless power radiated by the reader, a kinetic energy collector configured to collect movement of the livestock as electrical energy, and a thermoelectric energy collector configured to collect the body temperature of the livestock as electrical energy.

The harvesting power generator may further include an impedance matcher configured to match an impedance of an antenna of the tag to an impedance of the transmission antenna of the reader received through the antenna.

The tag may further include a light-emitting diode (LED) module configured to display an abnormal sign of the livestock when the abnormal sign is detected.

The reader may control a wireless signal emitted through the antenna by controlling the plurality of wireless power switching modules.

The reader may change radiation power output through the antenna and adjust recognizable tag distance information.

The reader may fix a radiation power of the antenna and estimate location information of the tag through an intensity of a signal backscattered from the tag.

The reader may reduce a tag location error through neural network training.

The plurality of antennas may be installed as a set in the pigsty to detect the tags in an entire area of the pigsty, and the reader may detect movement of the livestock using location information of the tags collected through the antennas installed as a set.

According to another aspect of the present invention, there is provided a smart barn control method for detecting an abnormal sign of livestock using tags worn by the livestock, an antenna installed in each pigsty for communication with the tags, a reader configured to collect information of the livestock bred in each pigsty through the antenna installed in the pigsty, and a plurality of wireless power switching modules between the antennas and the reader, the smart barn control method including measuring, by the tags attached to ears of the livestock, tag information of the livestock, controlling the wireless power switching module so that a wireless signal may be transmitted through the antenna installed in any pigsty to collect the tag information of the livestock bred in the pigsty, recognizing, by the reader, the tags attached to the livestock within a range in which the antenna installed in the pigsty recognizes the tags to collect the tag information of the livestock, and estimating an abnormal sign of the livestock using the collected tag information of the livestock.

The estimating of the abnormal sign of the livestock may include measuring a residence time of the tag recognized through the antenna installed at a feeder to detect an abnormal sign of a disease at an early stage.

The estimating of the abnormal sign of the livestock may include detecting an abnormal disease sign of the livestock using body temperature information of the livestock in the tag information recognized through the antenna installed at a feeder.

The estimating of the abnormal sign of the livestock may include controlling a power of a wireless signal output through the antenna to measure a location of the livestock through the antenna and detecting an abnormal disease sign of the livestock using the measured location information of the livestock.

Meanwhile, the estimating of the abnormal sign of the livestock may include fixing a radiation power of the antenna and estimating location information of the tag through an intensity of a signal backscattered from the tag to detect an abnormal disease sign of the livestock.

The estimating of the location information of the tag may include reducing a tag location error through neural network training.

The smart barn control method may further include displaying, when the abnormal sign of the livestock is detected, the abnormal sign through an LED module.

According to another aspect of the present invention, there is provided a tag attachable to livestock, the tag including an insertion portion having one side formed in a cone shape to easily pierce an ear of livestock, a body portion having one side extending in a cylindrical shape from the other side of the insertion portion and configured to pierce the ear of the livestock after the insertion portion does and support the tag, a temperature sensor provided in the body portion and configured to measure a body temperature of the livestock, an electronic part formed on the other side of the body portion so that the body portion may not come off the ear of the livestock in a state of being supported by the ear of the livestock, and a fixing portion having an insertion hole into which the insertion portion piercing the ear of the livestock is inserted so that the tag may be fixed to the ear of the livestock without coming off the ear after the fixing portion is attached to the ear of the livestock through the insertion portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for accomplishing the same will become apparent from exemplary embodiments described in detail below with reference to the accompanying drawings. However, the present invention is not limited to the exemplary embodiments set forth herein but may be implemented in various different forms. The exemplary embodiments are provided only to complete disclosure of the present invention and to fully convey the scope of the invention to those of ordinary skill in the art, and the present invention is defined by only the scope of the claims. Meanwhile, terms used in this specification are for describing the exemplary embodiments rather than limiting the present invention. In this specification, singular forms include plural forms unless expressly stated otherwise. As used herein, the word "comprises" and/or "comprising" do not preclude the presence or addition of one or more components, steps, operations and/or devices other than stated components, steps, operations and/or devices.

Figure 1:
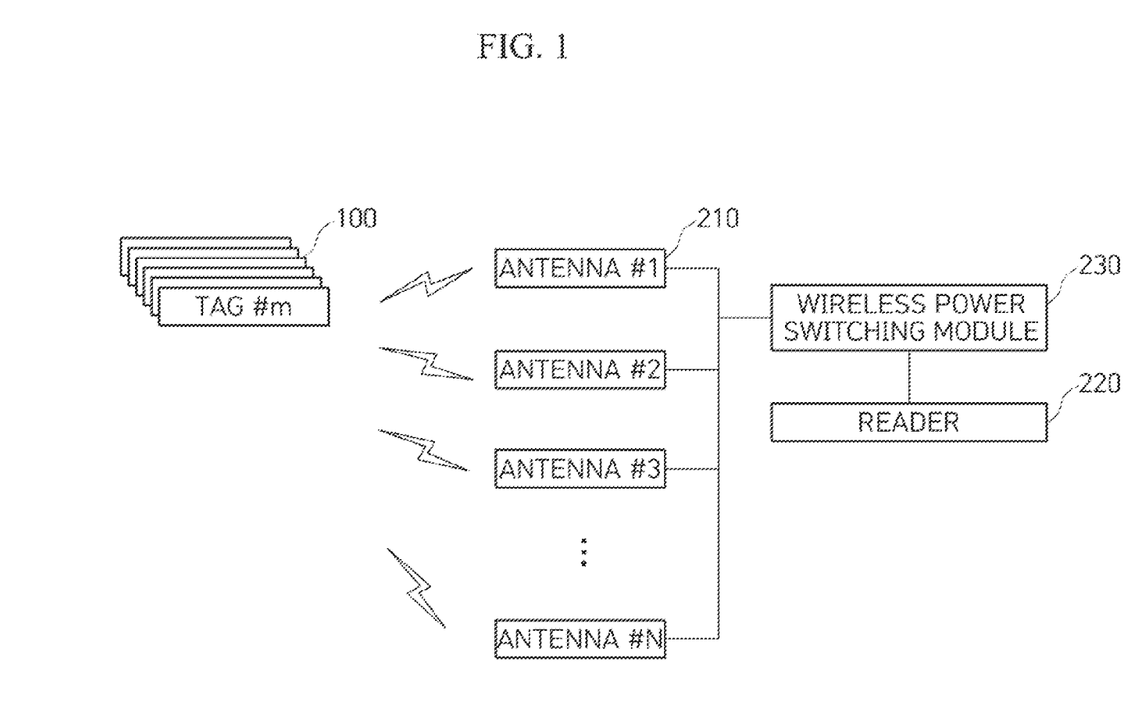
FIG. 1 is a block diagram illustrating a smart barn system for detecting an abnormal sign of livestock according to an exemplary embodiment of the present invention.

FIG. 1 is a block diagram illustrating a smart barn system for detecting an abnormal sign of livestock according to an exemplary embodiment of the present invention.

As shown in FIG. 1, the smart barn system for detecting an abnormal sign of livestock according to the exemplary embodiment of the present invention includes a plurality of tags 100, a plurality of antennas 210, a reader 220, and a wireless power switching module 230.

The tags 100 are attached to the ears of livestock bred in a pigsty to measure temperatures of the livestock and transfer the measured temperature information of the livestock.

Figure 2:
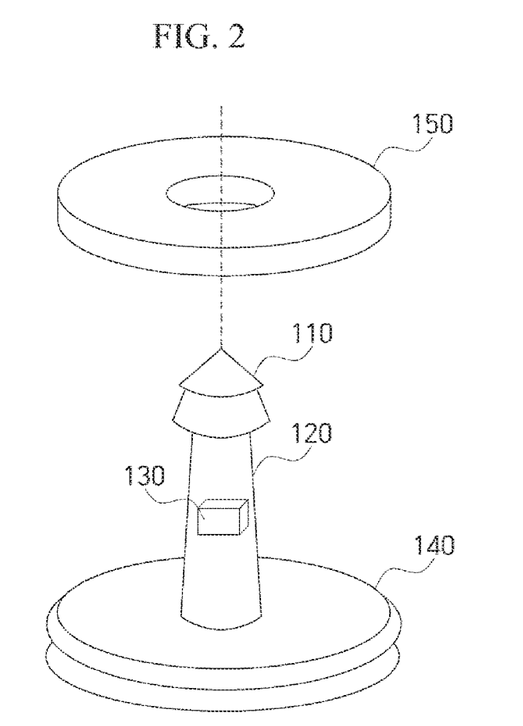
FIG. 2 is a perspective view of a tag of FIG. 1.

As shown in FIG. 2, the tags 100 include an insertion portion 110, a body portion 120, a temperature sensor 130, an electronic part 140, and a fixing portion 150.

The insertion portion 110 has one side formed in a cone shape to easily pierce the ear of livestock.

The body portion 120 has a cylindrical shape extending from the other side of the insertion portion 110. The body portion 120 pierces the ear of the livestock after the insertion portion 110 does and then supports the tag 100.

The temperature sensor 130 is provided in the body portion 120 and measures the body temperature of the livestock. Since the temperature sensor 130 is provided in the body portion 120, it is possible to prevent an error from being caused by an external temperature and measure an accurate body temperature of the livestock as long as the body temperature is measured while the body portion 120 pierces the ear of the livestock.

The electronic part 140 is provided on one side of the body portion 120 and functions to prevent the body portion 120 from coming off the ear of the livestock when the body portion 120 is coupled with the fixing portion 150 in a state of being supported by the ear of the livestock.

Figure 3:
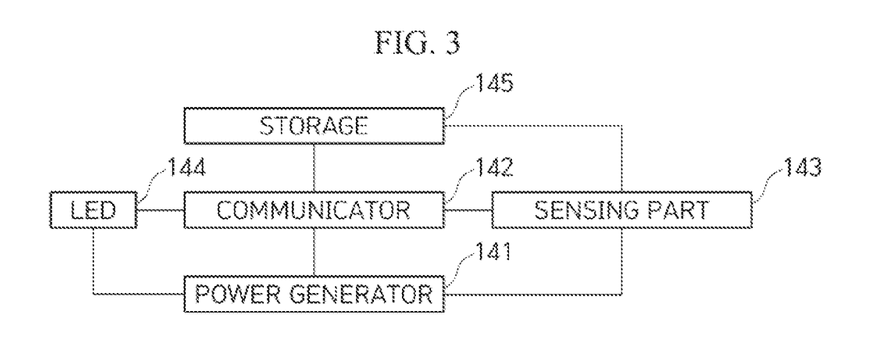
FIG. 3 is a block diagram illustrating a detailed configuration of an electronic part of FIG. 2.

As shown in FIG. 3, the electronic part 140 includes a power generator 141, a communicator 142, a sensing part 143, a light-emitting diode (LED) 144, and a storage 145.

The power generator 141 serves to generate power required for the tag 100 and supply the power to components which require power.

The communicator 142 serves to transmit the temperature information of the livestock measured by the temperature sensor 130 to the reader 220. The communicator 142 according to the exemplary embodiment of the present invention may employ a radio frequency identification (RFID) communication protocol.

In addition to the temperature sensor 130, the electronic part 140 according to the exemplary embodiment of the present invention may include the sensing part 143 for acquiring environmental information of the pigsty. The sensing part 143 may include a humidity sensor, a temperature sensor, and a carbon dioxide sensor to provide the environmental information of the pigsty.

Meanwhile, the power generator 141 may employ a harvesting power generator which generates power to be used by the tag 100.

Figure 4:
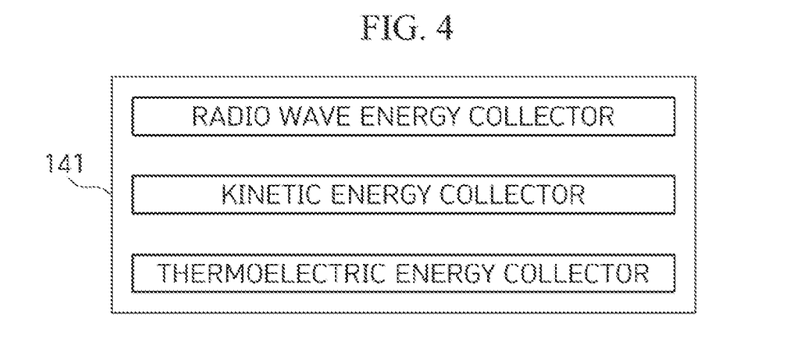
FIG. 4 is a block diagram illustrating a detailed configuration of a power generator of FIG. 3.

As shown in FIG. 4, the harvesting power generator may generate power using at least one of a radio wave energy collector which collects wireless power radiated by the reader 220 through the antenna 210, a kinetic energy collector which collects movement of the livestock as electrical energy, and a thermoelectric energy collector which collects the body temperature of the livestock as electrical energy.

Figure 5:
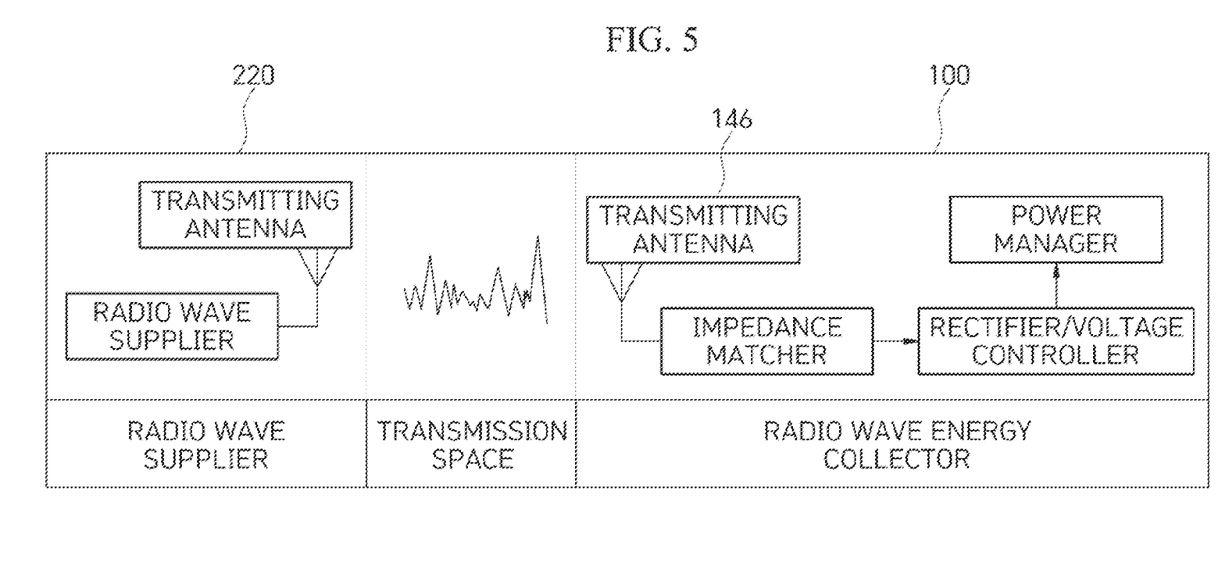
FIG. 5 is a reference diagram illustrating a method of generating power using a wireless signal in a radio wave energy collector among components of the power generator of FIG. 4.

As shown in FIG. 5, the harvesting power generator further include an impedance matcher 146 which matches the impedance of an antenna of the tag 100 to the impedance of the transmission antenna 210 of the reader 220 received through the antenna 210.

The tag 100 may further include the LED 144 which displays an abnormal sign of the livestock when the abnormal sign is detected.

The storage 145 is an electrically erasable programmable read-only memory (EEPROM) and may store data collected through the sensing part 143. The stored sensing data may be provided to the reader 220 through the communicator 142. Although an EEPROM may be used as the storage 145 according to the exemplary embodiment of the present invention, the storage 145 is not limited thereto.

At the center of the fixing portion 150, a hole is provided so that the insertion portion 110 piercing the ear of the livestock may be inserted thereinto. The fixing portion 150 may be formed of an elastic material.

After the insertion portion 110 pierces the ear of the livestock, the fixing portion 150 is fixedly inserted onto the insertion portion so as not to be separated.

One side of the antenna 210 is installed in each pigsty, and the other side is connected to an output port of the wireless power switching module 230. The antenna 210 transmits a wireless signal to the tags 100 and then receives a response signal from the tag 100. To this end, the antennas 210 may be installed in an extended manner through extension cables (not shown), and thus only the antennas 210 may be installed in the pigsties. The antennas 210 are detachably connected to the wireless power switching module 230. Accordingly, when the antenna 210 has a problem, the antenna 210 may be easily replaced.

The reader 220 receives the response signal provided from the tag 100 through the antenna 210 switched by the wireless power switching module 230. The reader 220 collects tag information of the livestock, which approaches an apparatus for providing feed and water, through any one of the plurality of antennas 210 and measure an access frequency of the livestock to each of the antennas 210 through the collected tag information of the livestock.

Here, the tag information may include at least one of behavioral information of the livestock, such as behavior to eat feed and behavior to drink water, movement information of the livestock, and body temperature information of the livestock which is biometric information of the livestock.

Figure 6:
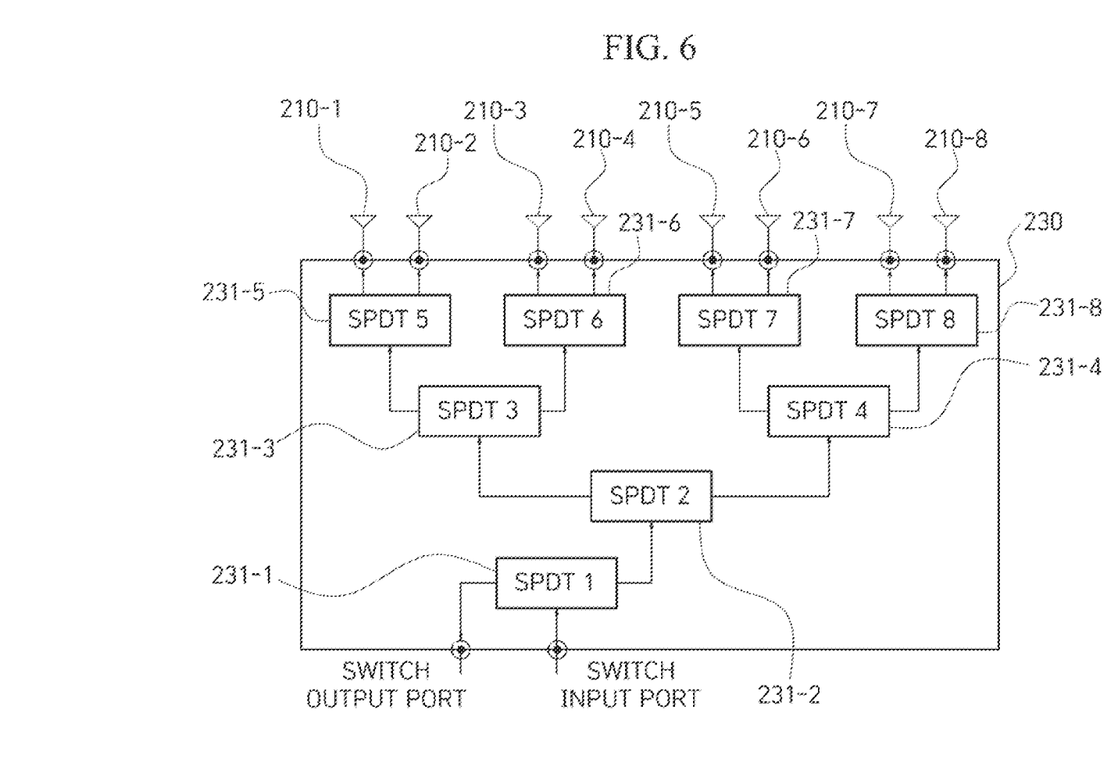
FIG. 6 is a block diagram illustrating a detailed configuration of a wireless power switching module of FIG. 1.

As shown in FIG. 6, the wireless power switching module 230 includes a plurality of power switches 231-1 to 231-8 configured in a cascade and switches antennas 210-1 to 210-8 so that a wireless signal may be transmitted according to control.

Figure 7:
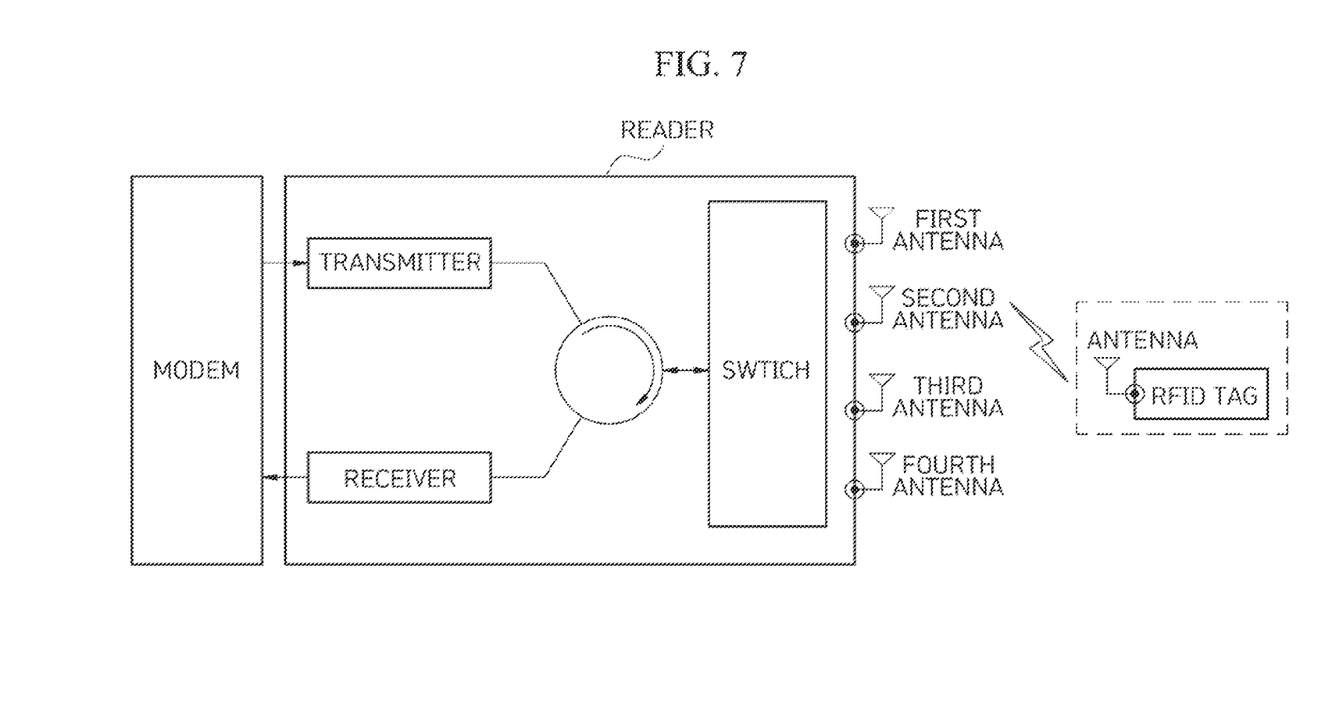
FIG. 7 is a reference diagram illustrating operations of a general reader and tag.

In the case of collecting tag information of livestock using existing tags and readers, a reader shown in FIG. 7 is installed in each pigsty to acquire information of an RFID tag, and thus the cost of building the system becomes high due to the relatively expensive reader. On the contrary, according to the present invention, although the number of readers is minimized, it is possible to acquire information of livestock residing in each pigsty. Accordingly, the cost of building the system can be minimized.

Therefore, according to the present invention, pig breeders, which are recently increasing in scale, can breed and manage livestock in units of tens of pigsties.

Meanwhile, the reader 220 controls a wireless signal emitted through the antenna 210 by controlling a plurality of wireless power switching modules 230.

Figure 8:
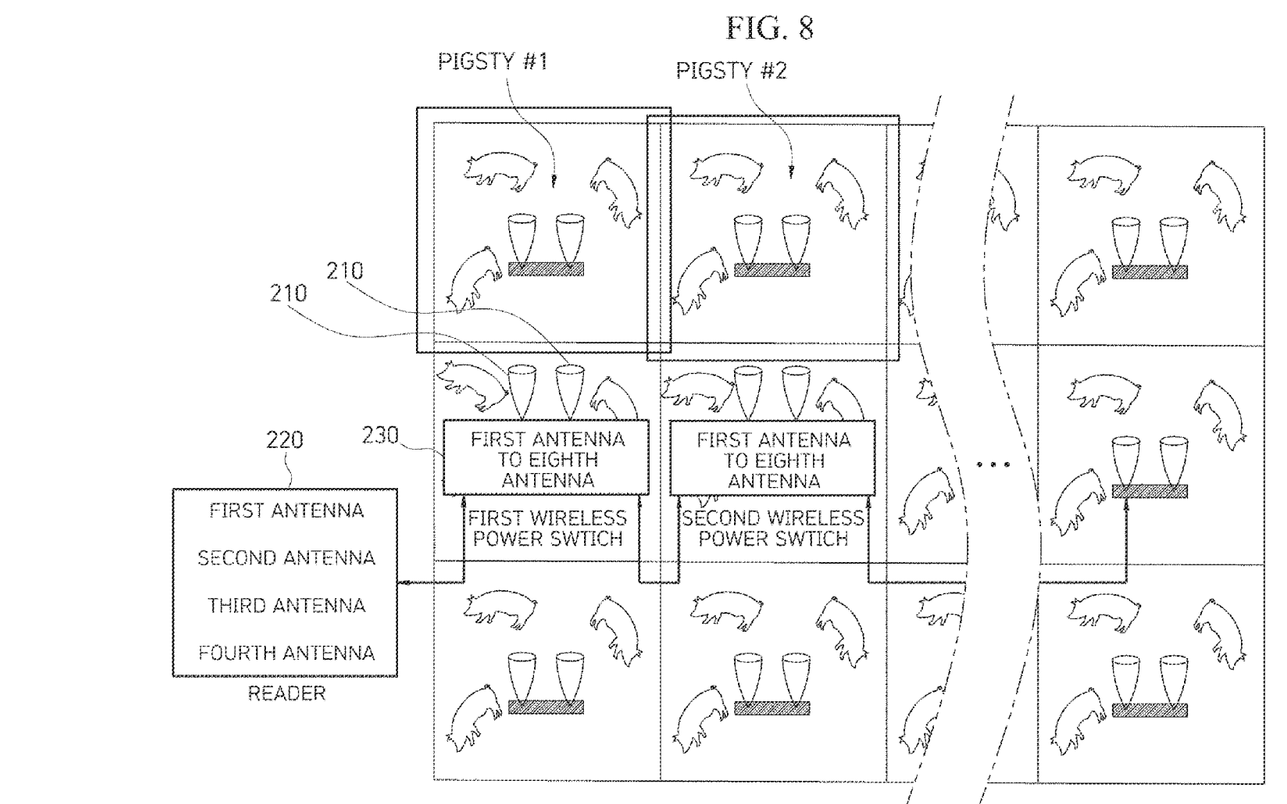
FIG. 8 is a reference diagram illustrating a pigsty according to an exemplary embodiment of the present invention.

As shown in FIG. 8, the exemplary embodiment of the present invention provides a method of managing tens of pigsties through the single reader 220 using the wireless power switching module 230.

To this end, a barn operator attaches the RFID tags 100 to ears of livestock and installs the antenna 210 at each pigsty so that all information on the history management, that is, production, a disease history, slaughter, a distribution process, etc., of the livestock being bred may be easily known.

Then, the barn operator switches the antenna 210 which will transmit a wireless signal through switching control of the wireless power switching module 230.

Specifically, a plurality of single pole double throw (SPDT) switches are connected in a cascade and embedded in the wireless power switching module 230.

The input port of one SPDT switch 231 is selected through path selection of the SPDT switches 231, and thus ports of the eight antennas 210 may be used through switching control.

As an example, the first SPDT switch 231-1 may be connected to a switch input port and a switch output port and connected to the second SPDT switch 231-2. When the SPDT switches 231 are connected in a cascade, tens of antennas 210-1 to 210-n may be connected to the one port of the reader 220.

When looking at an example of the operating principle of the wireless power switching module 230, the first SPDT switch 231-1 determines whether to select the wireless power switching module 230, and the second SPDT switch 231-2 to the eighth SPDT switch 231-8 determine a final antenna output port through path selection in the wireless power switching module 230.

The path selection in the wireless power switching module 230 may be controlled by a controller in the wireless power switching module 230 or a separate controller.

Table 1 below shows an example of operations of the wireless power switching module 230.

Meanwhile, the reader 220 may reduce a location error of the tag 100 through neural network training.

Figure 10:
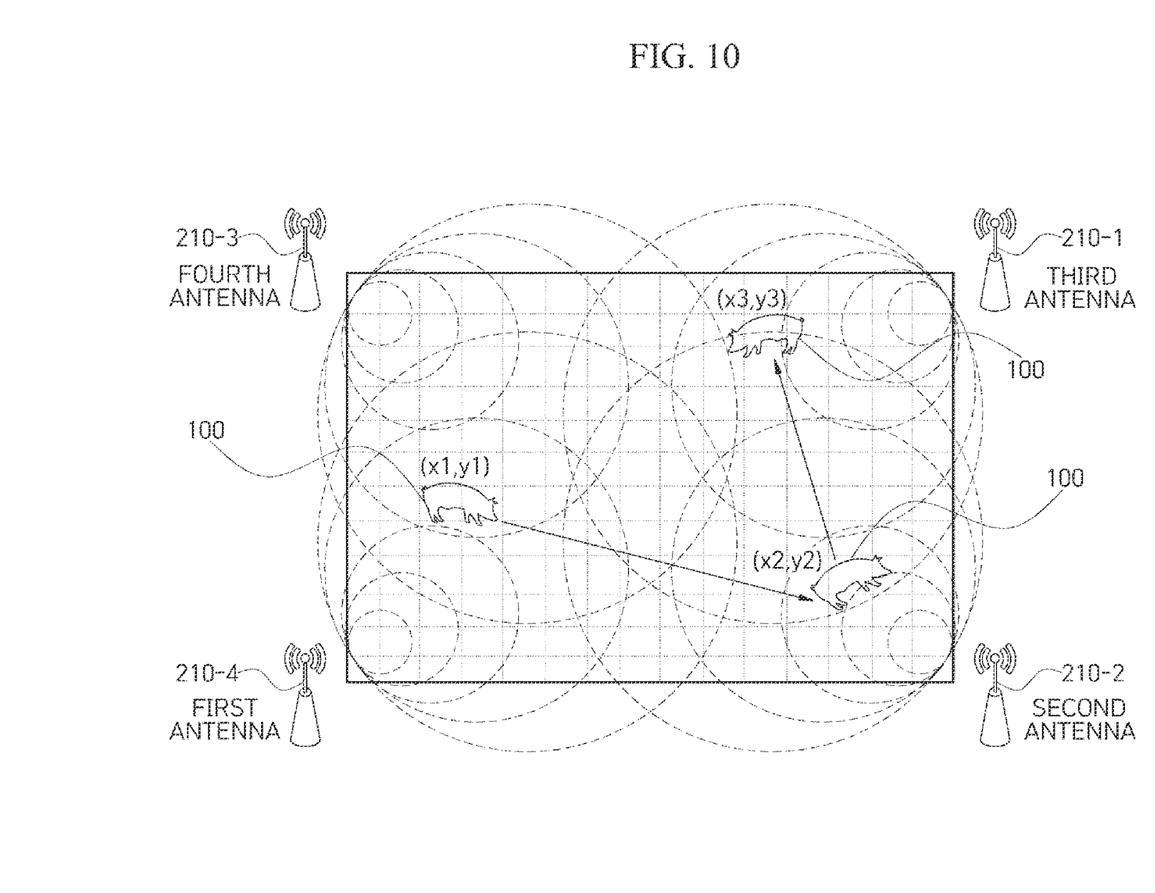
FIG. 10 is a reference diagram illustrating another example of installation of antennas in a smart barn control system for detecting an abnormal sign of livestock according to an exemplary embodiment of the present invention.

According to another exemplary embodiment of the present invention, a plurality of antennas 210-1 to 210-4 may be installed as a set in a pigsty as shown in FIG. 10 so that tags 100 may be detected in the entire area of the pigsty, and a reader 220 may detect movement of livestock using location of the tags 100 collected through the antennas 210-1 to 210-4 installed as a set.

Figure 11:
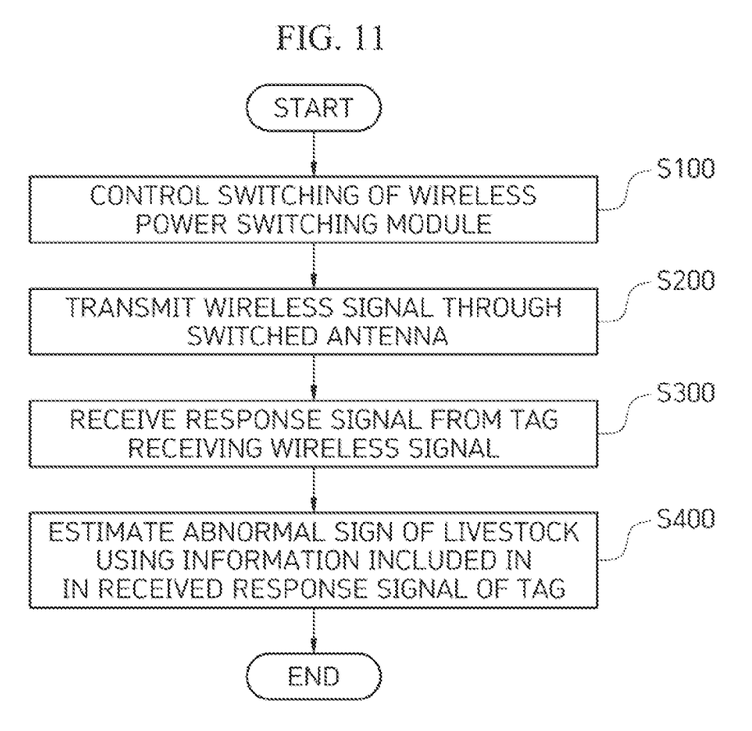
FIG. 11 is a flowchart illustrating a smart barn control method for detecting an abnormal sign of livestock according to an exemplary embodiment of the present invention.

FIG. 11 is a flowchart illustrating a smart barn control method for detecting an abnormal sign of livestock according to an exemplary embodiment of the present invention.

The smart barn control method for detecting an abnormal sign of livestock according to the exemplary embodiment of the present invention will be described below with reference to FIG. 11.

The smart barn control method for detecting an abnormal sign of livestock employs tags 100 worn by livestock, an antenna 210 installed in each pigsty for communication with the tags 100, a reader 220 which collects information of the livestock bred in each pigsty through the antenna 210 installed in the pigsty, and a plurality of wireless power switching modules 230 between the antennas 210 and the reader 220.

First, to collect tag information of the livestock bred in any one of the pigsties, switching of the wireless power switching module 230 is controlled (S100) so that a wireless signal may be transmitted through the antenna 210 installed in the pigsty.

Then, according to switching control of the wireless power switching module 230, a wireless signal is transmitted through the switched antenna 210 (S200).

Subsequently, the reader 220 receives a response signal including body temperature information of the livestock measured by the tag 100, which operates after receiving the wireless signal transmitted from the antenna 210, from the tags 100 (S300). Here, the tag 100 may sense environmental information of the pigsty through a separate sensing part, store the environmental information in a storage, and then provide the response signal including the environmental information when the wireless signal is received.

Subsequently, the reader 220 receives the response signal of the tag 100 through the antenna 210 switched by the

TABLE 1

| Antenna port | SPDT 1 | SPDT 2 | SPDT 3 | SPDT 4 | SPDT 5 | SPDT 6 | SPDT 7 | SPDT 8 |
|---|---|---|---|---|---|---|---|---|
| 1 | RIGHT | LEFT | LEFT | X | LEFT | X | X | X |
| 2 | RIGHT | LEFT | LEFT | X | RIGHT | X | X | X |
| 3 | RIGHT | LEFT | RIGHT | X | X | LEFT | X | X |
| 4 | RIGHT | LEFT | RIGHT | X | X | RIGHT | X | X |
| 5 | RIGHT | RIGHT | X | LEFT | X | X | LEFT | X |
| 6 | RIGHT | RIGHT | X | LEFT | X | X | RIGHT | X |
| 7 | RIGHT | RIGHT | X | RIGHT | X | X | X | LEFT |
| 8 | RIGHT | RIGHT | X | RIGHT | X | X | X | RIGHT |
| Others | LEFT | X | X | X | X | X | X | X |

Figure 9:
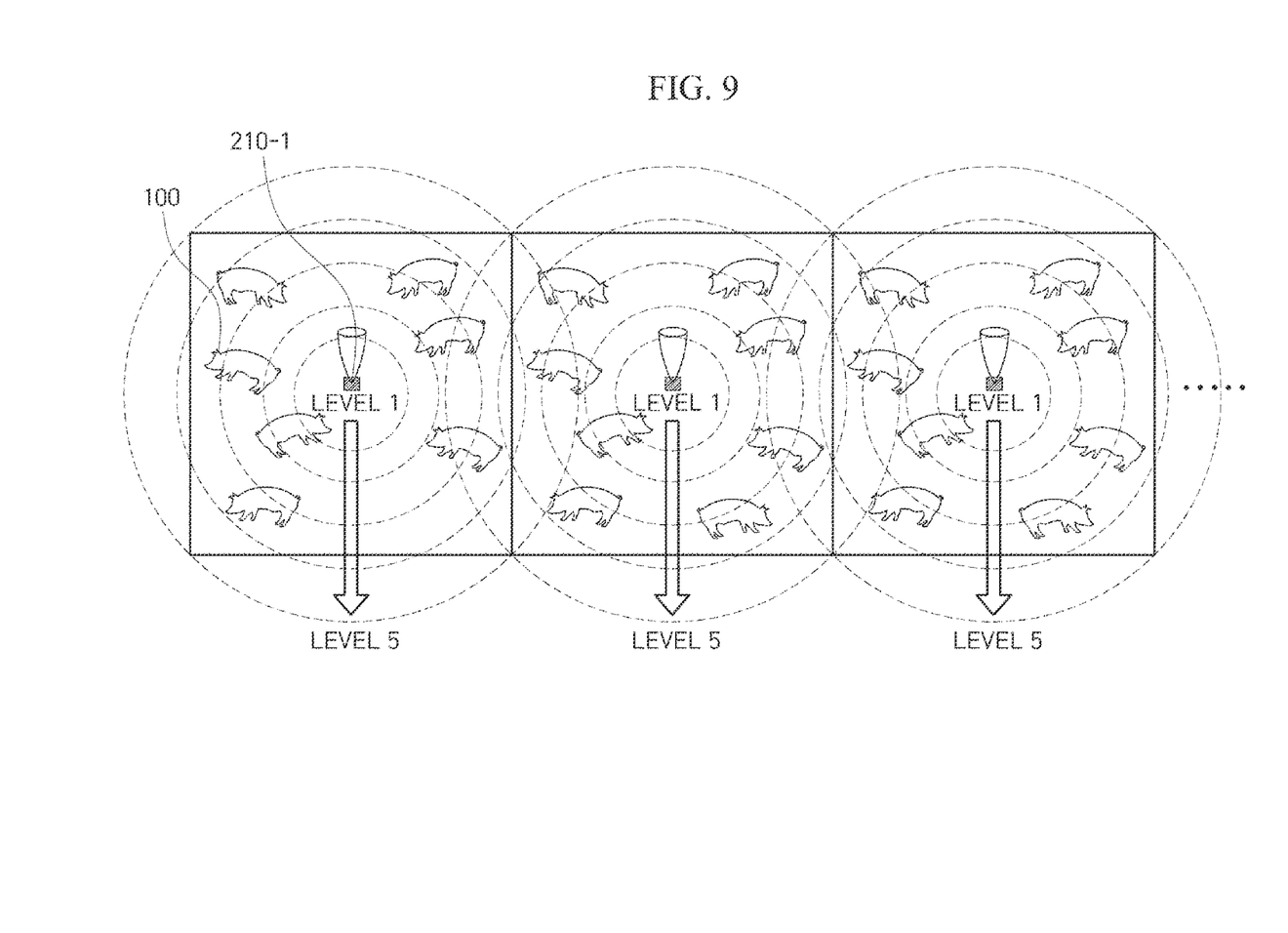
FIG. 9 is a reference diagram illustrating an output level of an antenna installed in a pigsty according to an exemplary embodiment of the present invention.

Meanwhile, as shown in FIG. 9, the reader 220 may change a radiation power output through the antenna 210-1 and acquire movement information of the tag 100 by adjusting recognizable distance information of the tag 100.

Alternatively, the reader 220 may fix the radiation power of the antenna 210-1 and estimate location information of the tag 100 through an intensity of a signal backscattered from the tag 100.

wireless power switching module 230 and estimates an abnormal sign of the livestock using information included in the response signal (S400).

In the operation S400 of estimating an abnormal sign of the livestock, a residence time of the tag recognized through the antenna 210 installed at a feeder may be measured to detect an abnormal sign of a disease at an early stage.

Meanwhile, in the operation S400 of estimating an abnormal sign of the livestock, an abnormal disease sign of the livestock may be detected using the body temperature information of the livestock among pieces of tag information recognized through the antenna 210 installed at the feeder.

Alternatively, in the operation S400 of estimating an abnormal sign of the livestock, a power of the wireless signal output through the antenna 210 may be controlled to measure a location of the livestock through the antenna 210, and an abnormal disease sign of the livestock may be detected using the measured location information of the livestock.

In the operation S400 of estimating an abnormal sign of the livestock, a radiation power of the antenna 210 may be fixed, and location information of the tag 100 may be estimated through an intensity of a signal backscattered from the tag 100 to detect an abnormal disease sign of the livestock.

Meanwhile, in the operation of estimating the location information of the tag 100 to detect an abnormal disease sign of the livestock, a tag location error through neural network training may be reduced.

When an abnormal sign of the livestock is detected, the abnormal sign may be displayed through an LED so that the livestock unit with the abnormal sign may be easily identified among the livestock units being bred.

Subsequently, the reader 220 controls the power switching module 230 so that a wireless signal may be transmitted through an antenna in the next pigsty. Here, a pigsty in which an antenna will transmit a wireless signal may be determined in order of distance from a pigsty, randomly, or in order of the number of livestock units being bred in a pigsty.

As for a time point at which an antenna transmits a wireless signal, after a wireless signal is transmitted from an antenna, switching to another antenna may be delayed until a response signal is received from a tag, or switching to another antenna may be performed regardless of a response signal of a tag.

The tag 100 according to the exemplary embodiment of the present invention includes the insertion portion 110, the body portion 120, the temperature sensor 130, the electronic part 140, and the fixing portion 150.

The insertion portion 110 has one side formed in a cone shape to easily pierce an ear of livestock.

The body portion 120 has one side extending in a cylindrical shape from the other side of the insertion portion 110 and supports the tag after piercing the ear of the livestock after the insertion portion 110 does. In the body portion 120, the temperature sensor 130 is embedded.

The temperature sensor 130 is provided in the body portion 120 to measure the body temperature of the livestock.

The electronic part 140 is formed on the other side of the body portion 120 so that the body portion 120 may not come off the ear of the livestock in a state of being supported by the ear of the livestock. The electronic part 140 performs a general function of the tag 100.

The fixing portion 150 is inserted onto the insertion portion, which pierces the ear of the livestock, so that the tag 100 may be fixed to the ear of the livestock without coming off the ear after the fixing portion 150 is attached to the ear of the livestock through the insertion portion 110.

The storage 145 may store information sensed by the sensing part 143. When a wireless signal is received through the communicator 142, the sensing information stored in the storage 145 may be provide to the reader 220 using the wireless signal.

For reference, the reader according to the exemplary embodiment of the present invention may be implemented in the form of software or hardware, such as a field programmable gate array (FPGA) or an application specific integrated circuit (ASIC), and may perform certain roles.

Here, "components" are not limited to software or hardware, and each component may be configured to be in an addressable storage medium or configured to run one or more processors.

Therefore, examples of components include components such as software components, object-oriented software components, class components, and task components, processes, functions, attributes, procedures, subroutines, segments of program code, drivers, firmware, microcode, circuitry, data, databases, data structures, tables, arrays, and variables.

The components and functionality provided in the components may be combined into fewer components or subdivided into additional components.

It should be appreciated that each block of flowcharts and combinations of the flowcharts may be performed by computer program instructions. Since the computer program instructions may be loaded into a processor of a general-use computer, a special-use computer, or other programmable data processing devices, the instructions executed through a processor of a computer or other programmable data processing devices generate units for performing functions described in connection with a block(s) of a flowchart. Since the computer program instructions may be stored in a computer-available or computer-readable memory which may direct a computer or other programmable data processing devices to implement a function in a specified manner, the instructions stored in the computer-available or computer-readable memory may produce a product including an instruction units for performing functions described in connection with a block(s) in a flowchart. Since the computer program instructions may be loaded into a computer or other programmable data processing devices, instructions, which generate a process executed by a computer as a series of operational steps performed in the computer or other programmable data processing devices and operate the computer or other programmable data processing devices, may provide steps for executing the functions described in connection with a block(s) in a flowchart.

Also, each block may represent a module, segment, or part of code including one or more executable instructions for executing a specific logical function(s). Further, it should be noted that in some replacement execution examples, the functions mentioned in blocks may occur in different orders. For example, two blocks which are consecutively shown may be performed substantially simultaneously or in a reverse order depending on corresponding functions.

As used herein, the term "~ unit" means a software element or a hardware element, such as an FPGA or an ASIC, and a "~ unit" plays a certain role. However, the term "~ unit" is not limited to a software or hardware element. A "~ unit" may be configured to reside on an addressable storage medium or may be configured to execute one or more processors. Accordingly, as an example, a "~ unit" includes elements, such as software elements, object-oriented software elements, class elements, and task elements, processes, functions, attributes, procedures, subroutines, segments of program code, drivers, firmware, microcode, circuits, data, databases, data structures, tables, arrays, and variables. A function provided in an element or a "~ unit"

may be combined with additional elements and "~ units" or may be split into additional elements or "~ units." Further, elements and "~ units" may be implemented to execute one or more central processing units (CPUs) in a device or a secure multimedia card.

According to an exemplary embodiment of the present invention, it is possible to detect an abnormal sign of a livestock disease at an early stage by analyzing feed and water intakes, measuring a body temperature of livestock, and analyzing livestock activity on the basis of RFID technology, In particular, an exemplary embodiment of the present invention can be compatible with existing RFID technology, and construction costs can be remarkably reduced.

Although the exemplary embodiments of the present invention have been described above with reference to the accompanying drawings, the embodiments are merely exemplary, and various modifications and alterations can be made by those of ordinary skill in the art without departing from the technical scope of the present invention. Therefore, the scope of the present invention is defined not by the above-described embodiment but by the following claims.

What is claimed is:

1. A smart barn system for detecting an abnormal sign of livestock, the smart barn system comprising:
a plurality of tags attached to ears of livestock bred in a pigsty and configured to measure temperatures of the livestock and transmit the measured temperature information of the livestock;
a plurality of antennas configured to transmit and receive wireless signals to and from the tags;
a reader configured to collect tag information of the livestock, which approaches an apparatus for providing feed and water, through any one of the plurality of antennas and measure an access frequency of the tag, which is collected through each of the antennas, through the collected tag information of the livestock; and
a plurality of wireless power switching modules provided between the antennas and the reader and connected in a cascade.

2. The smart barn system of claim 1, wherein the tag comprises:
an insertion portion having one side formed in a cone shape to easily pierce the ear of the livestock;
a body portion having one side extending in a cylindrical shape from the insertion portion and configured to pierce the ear of the livestock after the insertion portion does and support the tag;
a temperature sensor provided in the body portion and configured to measure the body temperature of the livestock;
an electronic part formed on the other side of the body portion so that the body portion does not come off the ear of the livestock in a state of being supported by the ear of the livestock; and
a fixing portion inserted onto the insertion portion, which pierces the ear of the livestock, so that the tag is fixed to the ear of the livestock without coming off the ear after the fixing portion is attached to the ear of the livestock through the insertion portion.

3. The smart barn system of claim 1, wherein the electronic part comprises:
a power generator configured to generate and supply power required for the tag; and
a communicator configured to transmit the temperature information of the livestock measured through the temperature sensor to the reader.

4. The smart barn system of claim 3, wherein the power generator comprises a harvesting power generator configured to generate the power to be used by the tag.

5. The smart barn system of claim 4, wherein the harvesting power generator generates the power using one or more of a radio wave energy collector configured to collect wireless power radiated by the reader, a kinetic energy collector configured to collect movement of the livestock as electrical energy, and a thermoelectric energy collector configured to collect the body temperature of the livestock as electrical energy.

6. The smart barn system of claim 5, wherein the harvesting power generator further comprises an impedance matcher configured to match an impedance of an antenna of the tag to an impedance of the transmission antenna of the reader received through the antenna.

7. The smart barn system of claim 1, wherein the reader controls a wireless signal emitted through the antenna by controlling the plurality of wireless power switching modules.

8. The smart barn system of claim 1, wherein the reader changes radiation power output through the antenna and adjusts recognizable tag distance information.

9. The smart barn system of claim 1, wherein the reader fixes a radiation power of the antenna and estimates location information of the tag through an intensity of a signal backscattered from the tag.

10. The smart barn system of claim 8, wherein the reader reduces a tag location error through neural network training.

11. The smart barn system of claim 1, wherein the tag further comprises a light-emitting diode (LED) module configured to display an abnormal sign of the livestock when the abnormal sign is detected.

12. The smart barn system of claim 1, wherein the plurality of antennas are installed as a set in the pigsty to detect the tags in an entire area of the pigsty, and
the reader detects movement of the livestock using location information of the tags collected through the antennas installed as a set.

13. A tag attachable to livestock, the tag comprising:
an insertion portion having one side formed in a cone shape to easily pierce an ear of livestock; a body portion having one side extending in a cylindrical shape from the other side of the insertion portion and configured to pierce the ear of the livestock after the insertion portion does and support the tag;
a temperature sensor provided in the body portion and configured to measure a body temperature of the livestock;
an electronic part formed on the other side of the body portion so that the body portion does not come off the ear of the livestock in a state of being supported by the ear of the livestock;
a fixing portion having an insertion hole into which the insertion portion piercing the ear of the livestock is inserted so that the tag is fixed to the ear of the livestock without coming off the ear after the fixing portion is attached to the ear of the livestock through the insertion portion;
wherein the tag is configured to communicate with the plurality of antennas and a reader, and wherein a plurality of wireless power switching modules are provided between the antennas and the reader and connected in a cascade.

* * * * *